(12) United States Patent
Dreher

(10) Patent No.: US 6,953,916 B2
(45) Date of Patent: Oct. 11, 2005

(54) CONTROL DEVICE FOR HAIRDRESSER CUTTING TOOL

(75) Inventor: Walter Dreher, Immendingen (DE)

(73) Assignee: "Jaguar"Stahlwarenfabrik GmbH & Co. KG, Solingen (DE)

(*) Notice: Subject to any disclaimer, the term of this patent is extended or adjusted under 35 U.S.C. 154(b) by 0 days.

(21) Appl. No.: 10/476,557

(22) PCT Filed: Apr. 24, 2002

(86) PCT No.: PCT/DE02/01491

§ 371 (c)(1),
(2), (4) Date: Jun. 3, 2004

(87) PCT Pub. No.: WO02/087833

PCT Pub. Date: Nov. 7, 2002

(65) Prior Publication Data

US 2004/0206748 A1 Oct. 21, 2004

(30) Foreign Application Priority Data

May 2, 2001 (DE) .......................... 101 21 427

(51) Int. Cl.[7] .................................. H05B 3/02
(52) U.S. Cl. ...................... 219/483; 219/486; 219/494; 219/222
(58) Field of Search ................. 219/200, 222, 219/225, 226, 240, 241, 482, 490, 494, 483, 486, 491; 52/36.1; 30/140, 232

(56) References Cited

U.S. PATENT DOCUMENTS

| 4,404,462 A | 9/1983 | Murray ........................ 219/497 |
| 4,840,000 A | * 6/1989 | Grines ......................... 52/36.1 |
| 5,060,381 A | * 10/1991 | Taberlet ....................... 30/232 |
| 5,309,640 A | 5/1994 | Caron .......................... 30/140 |
| 5,373,141 A | 12/1994 | Ko .............................. 219/497 |
| 5,743,017 A | 4/1998 | Dreher et al. ................ 30/140 |
| 5,986,241 A | 11/1999 | Funahashi .................... 219/497 |
| 6,084,211 A | 7/2000 | Bauer ......................... 219/242 |

FOREIGN PATENT DOCUMENTS

| DE | 200 06 776 | 11/2000 | .......... B26B/13/22 |
| DE | 200 13 503 | 12/2000 | .......... B26B/13/22 |

* cited by examiner

*Primary Examiner*—Tu Hoang
(74) *Attorney, Agent, or Firm*—Grossman Tucker Perreault & Pfleger, PLLC

(57) ABSTRACT

To facilitate work with several heatable hairdresser cutting tools, a control device for heatable hairdresser cutting tools is proposed, in which the power circuit device (3) is integrated in a mobile unit along with a storage battery (2) and an interface device (4) and the interface device (4) is designed for the connection of several heatable hairdresser cutting tools, where a connecting device (5, 6) is provided for each hairdresser cutting tool, via which current can be passed from the power circuit device (4) to heat the respective hairdresser cutting tool.

20 Claims, 1 Drawing Sheet

CONTROL DEVICE FOR HAIRDRESSER CUTTING TOOL

FIELD OF THE INVENTION

The invention relates to a control device for at least one heatable hairdresser cutting tool and a method for its operation.

BACKGROUND OF THE INVENTION

It is known that, following a conventional haircut, the hair ends are open, this allowing the multi-active cement substance to dry out and endogenic moisturising and nurturing substances of the hair to be secreted, as a result of which the cut hair is exposed unprotected to harmful environmental influences and consequently loses its shine, volume and bounce.

Sealing the hair ends in order to avoid this disadvantage when cutting hair is known from the prior art. This is achieved by the haircut being done with heated scissors, whereby each cut hair is sealed at the cut surface and thus largely restored to its original condition. Devices are known for this method that comprise a control device mounted on a mobile or stationary stand and a heatable hairdresser cutting tool, such as haircutting scissors, hair styling scissors or a razor, connected to the control device via a long cable. As the hairdresser frequently has to change position while cutting hair, the cable has to be trailed along appropriately, making the device more difficult to handle. Moreover, a cable lying on the floor involves a risk of tripping, this possibly resulting in damage to the device or even injury to both the hairdresser and the customer.

In a hairdresser cutting tool available on the market, the scissors are connected via a cable to a power circuit that sets the heating current, is located in a separate housing and can be attached to the hairdresser's breast pocket or belt by means of an integrated clip. The power circuit itself has a further cable connecting it to a power supply unit for providing the heating current, meaning that the use of scissors of this kind with heatable blades likewise displays the disadvantages described above.

Furthermore, DE 200 06 776 discloses an electrically heatable cutting element in the form of a pair of scissors, in which both the power circuit and the power supply unit are integrated in the scissors themselves. To this end, the scissors are provided with a housing to accommodate a battery or storage battery in the region of one grip eye. This housing increases the length of the scissors by at least 50%. Moreover, as the weight of the batteries or storage batteries is several times greater than the weight of the scissors alone, the use of scissors of this design takes a lot of getting used to or is impracticable for a lengthy period of time.

An electrically heatable cutting instrument is known from DE 200 13 503 U1, which has two legs that are connected to each other in articulated fashion via a pivot and each display a grip area and a cutting area, as well as a power supply unit, where a power source that is independent of the mains, such as a storage battery, can be connected in the grip area of one leg. The storage battery can be mounted directly on the leg, or also designed as a pocket-type storage battery that the user of the cutting instrument carries in his pocket, the cutting instrument and the storage battery being connected via a cable. Also mounted on the leg of the cutting instrument is an electronic temperature analyser to regulate the heating current.

SUMMARY OF THE INVENTION

The object of the invention is to facilitate work with heatable hairdresser cutting tools.

The invention solves this object by means of a control device and a method for operating a control device.

Thus, the control device according to the invention for at least one heatable hairdresser cutting tool comprises a means for providing electrical energy, a control device, a storage device, a means for entering at least one predefined operating parameter, an electronic power circuit for providing the heating current, an interface device to which at least one heatable hairdresser cutting tool can be connected and via which current from the power circuit can be passed, as well as means for detecting electronic signals that can be assigned to an actual temperature of at least one hairdresser cutting tool. The control device activates the electronic power circuit in response to a predefined target temperature of the hairdresser cutting tool in order to provide the heating current. In order to give the hairdresser greater freedom of movement and prevent a risk of injury or of damaging the device, provision is made for at least the means for providing electrical energy, the power circuit device and the interface device to be integrated in a portable mobile unit that is separate from the heatable cutting tool. To facilitate work with heatable hairdresser cutting tools, the invention provides for the interface device to be designed for connecting several heatable hairdresser cutting tools, where a connecting device is included for each hairdresser cutting tool, via which current can be passed from the power circuit device for heating the respective hairdresser cutting tool.

The invention is based on the idea of making work with heatable hairdresser cutting tools more flexible in that several hairdresser cutting tools can be in operation simultaneously without requiring a separate control device for each one.

This is achieved by the control device being designed for the connection of several hairdresser cutting tools. This makes it possible, for example, for all the hairdresser cutting tools used for a haircut, such as scissors, styling scissors and a razor, to be of heatable design without the freedom of movement of the hairdresser being restricted by the additional tools. As the hairdresser cutting tools can be connected to the interface device on the mobile unit, which the hairdresser wears on his belt or in a holster, for example, the hairdresser's freedom of movement is comparable to that in a situation where he works with conventional scissors. The holster can be provided with a carrying strap or a belt fastener in this context.

The control device designed in accordance with the invention gives the hairdresser hitherto unknown freedom of movement when using several heatable hairdresser cutting tools, as he can switch from one workplace to another at will without tiresome disconnection from the stationary part of the control device. In this way, it is possible, for example, for the hairdresser to switch from one haircutting job to another customer without having to lay down or switch the heatable hairdresser cutting tools. In any event, it can be ensured that the hairdresser cutting tools required in a hair salon can all be operated with a single control device, so that the hairdresser can, as described, move freely in the salon and take the necessary tools with him wherever he goes. Depending on the embodiment of the invention, it is also possible for the entire control device to be integrated in the mobile unit. In this case, a heatable hairdresser cutting tool can also be used in small business premises with a pronounced lack of space, or also particularly easily when visiting customers, for instance in senior citizens' homes or hospitals, as all the electrical devices are included in a portable mobile unit. Generally speaking, the device can also be used in places without a connection to the power mains, as it is completely independent of the mains if it has previously been charged.

In order to limit the size and weight of the mobile unit, provision can be made for certain components of the control device to be located in a stationary unit that communicates with the mobile unit via an air interface, particularly a radio interface, where data for controlling the power circuit can be transmitted from the stationary unit to the mobile unit via the air interface. To permit temperature control, provision can be made for transmission of data relating to the temperature of the hairdresser cutting tool via the radio interface from the mobile unit to the stationary unit.

The stationary unit can accommodate all the devices that need not necessarily be integrated in the mobile unit but facilitate use of the control device according to the invention. This relates, for example, to an input device, a display device and a PC interface, via which, for instance, tool-specific data, service data, customer data or other operating parameters can be loaded into an EEPROM in the stationary unit. This also permits the creation of a customer management system, in which customer-specific data, such as cutting temperature, can be stored in retrievable form in the stationary unit.

The air interface can also be designed as an infrared interface, which requires optical contact to establish a data link between the mobile unit and the stationary unit. An infrared interface is, however, more favourable than a radio interface as regards cost and exposure of the users to electromagnetic radiation. In either case, the stationary unit can also be equipped to control several mobile units.

In order to avoid numerous leads being necessary between the tools and the control device, despite the connection of several hairdresser cutting tools to the control device according to the invention, provision can be made for not only the heating current, but also signals relating to the actual temperature to be passed from the cutting tool to the control device via the respective connecting device of a hairdresser cutting tool. According to the invention, the interface device or connecting device can, for example, be designed in the form of a plug-and-socket connection, or also in the form of a clamped connection or a soldered connection.

To avoid having to integrate several power circuits for operating several hairdresser cutting tools in the mobile unit, provision can be made for the heating current supplied by the power circuit to be switchable to one of the several connecting devices by means of a switching device. In this context, a single connecting device can be designed as a connector in such a way that the heating current and signals relating to the actual temperature can be passed via the connector simultaneously.

Wearing of the mobile unit by the hairdresser and the handling of the control device according to the invention are facilitated by the mobile unit displaying a fastening device for attaching to an associated belt or holster.

In order to indicate a heating phase or the reaching of the target temperature for a heatable hairdresser cutting tool, provision can be made for the control device according to the invention to possess an optical indicator, such as red LEDs for indicating a heating phase and green LEDs for reaching the target temperature. However, provision can also be made for the target and actual temperature to be indicated on a display.

If several heatable hairdresser cutting tools are connected to the control device according to the invention, the above-mentioned selector switch is used to switch the respective heating current of the power circuit to the hairdresser cutting tool requiring heating at the time. This makes it possible to save on additional power circuits and thus on weight. It is particularly advantageous if the selector switch and the power circuit device are integrated in a single device displaying one input, several outputs and a locked position. Provision can be made in this context that, if the temperature of at least one hairdresser cutting tool drops below the target temperature by a predefined value, a heating current is supplied to the hairdresser cutting tool displaying the greatest instantaneous deviation from the respective target temperature. In another, optional heating method, provision can be made for the heating of one particular cutting tool to have priority over the heating of the other cutting tools, meaning that the first-named cutting tool is always heated to target temperature first. In addition, provision can also be made that, even if this first cutting tool is below the target temperature and is thus heated, a minimum heating time within a predefined period is guaranteed for a second cutting tool by it being heated at least during the minimum heating time, regardless of the status of the first cutting tool.

For the control device according to the invention to adjust automatically to the connected hairdresser cutting tool, or to automatically take into account different cable lengths between the control device and the cutting tool, provision can be made for means for detecting the heating current passed via the interface and/or the voltage at the interface to be included, where the resistance of the cutting tool connected to the interface, including the resistance of the cable used, can be ascertained by determining the heating current and the voltage, as a result of which, given appropriate graduation of the resistance of the different hairdresser cutting tools and the cables that can be used, it is possible to make a distinction according to the connected cutting tool and the cable used. In this way, a particular hairdresser cutting tool can, on the one hand, be heated with its specific operating parameters and the connected cable also taken into account, meaning that every cutting tool can be heated, regardless of the cable. Moreover, it is also possible to directly measure the resistance of the connected cutting tool, including the cable used to connect the cutting tool, by means of an appropriate resistance measuring device and, as described, to set the specific heating parameters of a particular hairdresser cutting tool.

On the other hand, in order to save on a temperature sensor for detecting the temperature of the cutting tool, provision can be made for the temperature of the cutting tool to be determined by measuring the heating resistance. To this end, the cutting tool is calibrated prior to use by determining the heating resistance as a function of the temperature of the cutting tool and saving the value. During use, conclusions as to the current temperature can then be drawn by measuring the resistance.

Moreover, measuring the heating current also makes it possible to detect and indicate a cable break during operation.

However, provision can also be made for the connected hairdresser cutting tools to be consecutively supplied with an assigned heating current as required, in which context hairdresser cutting tools that have reached their assigned target temperature within defined limits are skipped.

To prolong the service life of the storage battery device, provision can be made for an acoustic signal to be output if the storage battery voltage drops below a predefined first value, the software of the control device to be deactivated if the storage battery voltage drops below a predefined second value and the hardware of the control device to be deactivated if the storage battery voltage drops below a predefined third value.

In practice, the operating time that can be achieved with a storage battery device consisting of 5 AAA batteries with a voltage of 1.2 volts and a capacitance of 4000 mAh, for instance, is roughly 1 to 2 hours with a maximum heating current of 3 amperes, meaning that the invention is suitable for everyday use without restriction.

BRIEF DESCRIPTION OF THE DRAWINGS

The invention is explained below by describing several embodiments in reference to the enclosed drawings, where.

DETAILED DESCRIPTION OF THE INVENTION

Figure 1:
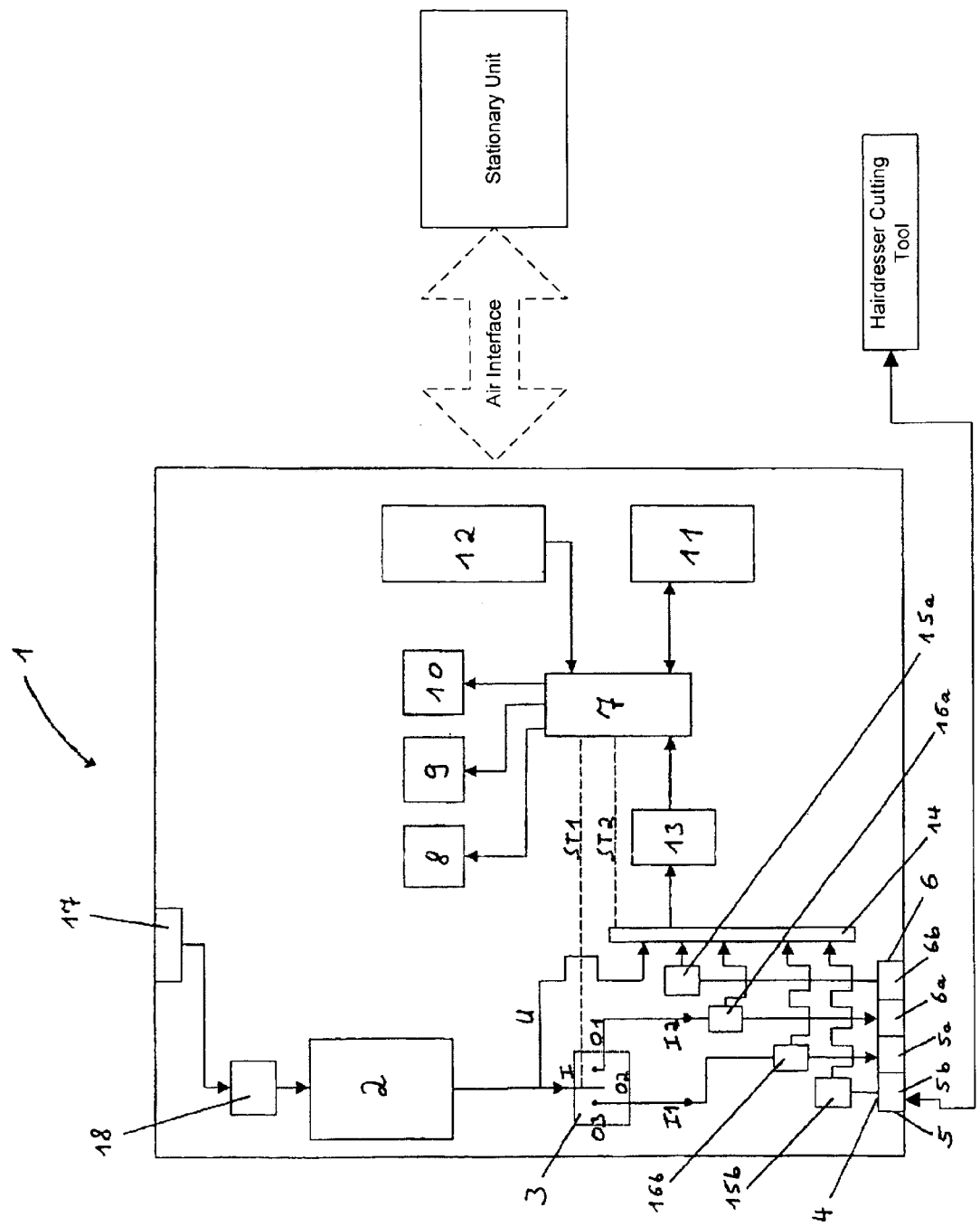
FIG. 1 shows a block diagram of the control device according to the invention.

In the embodiment of control device 1 according to the invention illustrated in FIG. 1, all the electrical devices for operating electrically heatable hairdressing scissors and razors are integrated in a portable housing. The control device encompasses microprocessor 7, which is connected to input device 12, storage device 11, acoustic warning device 8, LED device 9 and LCD display device 10. Microprocessor 7 controls power circuit device 3, with which the output of storage battery 2 can be connected to heating current connections 5a and 6a. These heating current connections are part of interface device 4, which, in the present embodiment, has two connecting devices 5, 6, to each of which a hairdresser cutting tool can be connected. To this end, connecting devices 5, 6 each encompass a heating current connection 5a or 6a and a temperature sensor connection 5b or 6b. Heating currents I1 and I2 are each detected in a current measuring device, which outputs a voltage proportional to the measured heating current and passes it via multiplexer 14 to A/D converter 13, which forwards a corresponding digital value to microprocessor 7. In addition, storage battery voltage U is present directly at one of the multiplexer inputs, as is a voltage emitted by resistance measuring devices 15a, 15b, which is dependent on the respective output resistance of temperature sensor connections 5b, 6b. Power circuit device 3 is controlled by microprocessor 7 via a first control lead ST1, and the multiplexer by a second control lead ST2. To preserve the clarity of the illustration, the supply of power to the individual electrical components via the battery voltage is not shown.

The mode of operation of control device 1 according to the invention is explained below. It is assumed for this purpose that a pair of hair scissors is connected to connecting device 5 and a pair of styling scissors to connecting device 6.

After switching on the control device, microprocessor 7 runs in an initialisation mode, in which power circuit device 3 is activated by microprocessor 7 via control lead ST1 in such a way that it first applies storage battery voltage U to output O1. Via control lead ST2, the processor activates multiplexer 14 to forward the storage battery voltage to analogue-to-digital converter 13, which passes on the storage battery voltage to microprocessor 7 in the form of a digital value. After this, multiplexer 14 is activated to apply the voltage signal from current measuring device 16a to A/D converter 13, which passes on an associated digital value to microprocessor 7. If a heating current I2≠0 flows, the microprocessor recognises that a consumer is connected to connecting device 6. After this, the switch of the power circuit device is set back to its locked position O2, so that the hairdresser cutting tool connected to connecting device 6 is not unintentionally heated. Processor 7 uses the measured storage battery voltage U and heating current I2 to calculate the output resistance of heating current connection 6a, which corresponds to the heating resistance of the cutting tool connected to connecting device 6, including the resistance of the cable used between connecting device 6 and the cutting tool. The microprocessor compares the determined value with the resistance values stored in storage device 11. In the embodiment described, the heating resistance of the hair scissors is roughly 2 ohms, the heating resistance of the razor roughly 2.5 ohms and the heating resistance of the styling scissors roughly 1.5 ohms. Cables in two lengths with resistances of 150 mOhm and 300 mOhm are available for connecting the control device according to the invention and the heatable hairdresser cutting tool. All the values mentioned are stored in storage device 11. By comparing the determined resistance value with stored resistance values, the microprocessor unequivocally recognises which hairdresser cutting tool and which cable is connected to connecting device 6 and loads or calculates the resulting operating parameters, saving these in a memory within the processor. These operating parameters can, for example, include a signal ratio for the on time and off time for a heating procedure. Specifying the signal ratio makes it possible to limit the load on the storage battery and adapt it to the output resistance of the connecting device. The hair scissors connected to connecting device 6, and the cable determined, are displayed on LCD monitor 9 of control device 1.

After this, the same procedure is performed for connecting device 5 and the styling scissors connected to it, and the determined styling scissors, including the cable, are also displayed on the LCD monitor and the end of the initialisation procedure is indicated by piezoelectric indicator 8. If no cutting tool is detected at any of the connecting devices, a special alarm tone sequence is output via the piezoelectric indicator.

The user now has the option of separately entering a target temperature for both pairs of scissors on input device 12 and starting the heating procedure. The heating mode for both heating current connections 5a, 6a is indicated in each case by red LED 9. During the heating phase, a signal that is dependent on the respective temperature is continuously requested by processor 7 via control lead ST2. In this context, each pair of scissors displays a resistor located in the vicinity of the blades, the resistance value of which depends on the blade temperature. This resistor, which is also known as an NTC thermistor, is connected to temperature sensor connection 5b or 6b of control device 1 and detected by means of resistance measuring device 15a or 15b, which outputs a voltage that is proportionally dependent on the measured resistance via multiplexer 14 to A/D converter 13. Based on the resistance characteristic of the NTC thermistor used, which is also stored in storage device 11, microprocessor 7 calculates the temperature deviation and then activates the switch in power circuit device 3 via control lead ST1. The temperature is realised in the described manner by the running of a program in processor 7, where the program contains a software representation of a linear control device, a derivative control device and an integral control device. This ensures that the actual temperature of the scissors in question is adjusted to the set target temperature as quickly as possible. Once the target temperature has been reached, a green LED 9 assigned to the respective connecting device is activated.

As explained above, only one of the two heating resistors is supplied with the associated heating current at any given time, where the mean heating current is defined as a function of the connected hairdresser cutting tool and the cable by setting appropriate idle and heating intervals. For example, when the storage battery is fully charged, the hair scissors with a resistance of 2 ohms and the shortest cable with a resistance of 300 mOhm are operated with a heating interval and an idle interval of 200 msec each, this corresponding to a mean heating current of roughly 1.5 A.

Depending on the embodiment of the invention, heating current connections 5a, 6a can be supplied with heating current consecutively in a predefined manner until the respective target temperature is reached. For instance, connection 5a is supplied with the specific heating current, taking into account the given heating and idle intervals, until the predefined target temperature is reached, after which heating connection 6a is supplied with its specific heating current. Once the target temperature assigned to connecting device 6 has been reached, the system switches back to connecting device 5.

In another embodiment of the invention, the hairdresser cutting tool whose temperature is furthest below the target temperature is supplied with the associated heating current.

In the embodiment of the invention illustrated in FIG. 1, storage battery 2 is connected to charging circuit 18, which can be connected to an external power source by means of power connection 17. In another embodiment of the invention, control device 1 has a storage battery holder, from which a drained battery can be removed and into which a charged battery can be inserted. Power connection 17 for connection to mains voltage is wired in such a way that the electrical components are supplied with voltage and a heating current is available, even if the storage battery has been removed. To protect the storage battery, an acoustic warning signal is emitted if the voltage drops below 5.2 V, the heating current is switched off by the software by deactivating power circuit device 3 if the voltage drops below 5 V, and the entire control device is switched off by the hardware by means of a device not shown in the illustration if the storage battery voltage drops below 4.3 V.

In another embodiment of the invention, only the storage battery, the power circuit device and the interface device are integrated in a portable mobile unit separate from the heatable cutting tool, while microprocessor 7 with the input device, the storage device and the indicator devices is contained in a stationary housing, where the stationary unit communicates with the mobile unit via a radio interface. As in the embodiment described above, the mobile unit has a fastening device for attaching to a belt worn by the hairdresser, and the heatable scissors are connected to the mobile unit by means of a cable. Control pulses for activating the power circuit device and the multiplexer are transmitted to the mobile unit via the radio interface, and the digitised values of the A/D converter are transmitted from the mobile unit to the control device.

What is claimed is:

1. Control device for a heatable hairdresser cutting tool, comprising:
   means for providing electrical energy;
   a controller;
   means for entering at least one predefined operating parameter, including a target temperature of the hairdresser cutting tool;
   a power circuit device for providing a heating current;
   an interface device to which the heatable hairdresser cutting tool can be connected and via which electrical energy can be passed from the power circuit device for heating the heatable hairdresser cutting tool, and
   means for detecting electrical signals that can be assigned to an actual temperature of the at least one hairdresser cutting tool, where the controller activates the power circuit device to provide the heating current in response to a predefined target temperature, wherein the means for providing electrical energy and the interface device are integrated, separately from the heatable hairdresser cutting tool, in a mobile unit to be worn by a user, characterised in that the power circuit device is integrated in the mobile unit and the interface device is designed for the simultaneous connection of several heatable hairdresser cutting tools, where a connecting device is included for each of the several heatable hairdresser cutting tool, via which current can be passed from the power circuit device for heating the respective hairdresser cutting tool, and furthermore where the heating current can be switched to one of the connecting devices by means of a switching device; and
   characterised by a stationary unit which communicates with the mobile unit via an air interface, where data for controlling the power circuit device can be transmitted from the stationary unit to the mobile unit via the radio interface.

2. Control device according to claim 1, characterised in that data concerning a temperature of a hairdresser cutting tool can be transmitted from the mobile unit to the stationary unit via the radio interface.

3. A method for operating a control device for a plurality of heatable hairdresser cutting tools, the control device comprising an interface device capable of being connected simultaneously to said plurality of heatable hairdresser cutting tools, an electrical energy for heating the heatable hairdresser cutting tools passed via the interface device, the method comprising:
   detecting a current and/or a voltage passed via the interface device;
   supplying the plurality of heatable hairdresser cutting tools with a heating current from a single power circuit; and
   supplying one or none of the plurality of heatable hairdresser cutting tools with a heating current assigned to a respective heatable hairdresser cutting tool at any point in time.

4. A method according to claim 3, further comprising determining an output resistance of the interface device.

5. A method according to claim 4, further comprising comparing the output resistance of the interface device with stored resistance values, and setting predefined operating parameters assigned to a predefined heatable cutting tool in response to the compared output resistance of the interface and the stored resistance values.

6. A method according to claim 5, further determining a resistance of a cable connected to the interface device, and adapting predefined operating parameters to the cable resistance to take into account an electrical power dissipated by the cable.

7. A method according to claim 3, further comprising assigning each of the plurality of heatable hairdresser cutting tools a target temperature, determining an actual temperature of each heatable hairdresser cutting tool, and supplying a heating current to a heatable hairdresser cutting tool when the actual temperature is below the target temperature by a predefined value, wherein the heating current is supplied to a one of the plurality of heatable hairdresser cutting tool displaying a greatest instantaneous deviation from a respective target temperature.

8. A method according to claim 3, further comprising outputting an acoustic and/or optical signal if a storage battery voltage drops below a predefined minimum voltage by a predefined first value, deactivating software of a control device in the storage battery voltage drops by a predefined second value, and deactivating hardware of the control device if the storage battery voltage drops below a predefined third value.

9. A control device for a heatable hairdresser cutting tool comprising:
- a mobile unit to be worn by a user, the mobile unit comprising a means for providing electrical energy, a power circuit for providing a heating current, and an interface device capable of simultaneous connection to a plurality of heatable hairdresser cutting tools and capable of passing electrical energy from the power circuit via respective connecting devices of the plurality of heatable hairdresser cutting tools for heating at least one of said plurality of heatable hairdresser cutting tools, the mobile unit separate from said plurality of heatable hairdresser cutting tools;
- a means for entering at least one predefined operating parameter including a target temperature of the at least one heatable hairdresser cutting tool;
- a means for detecting electrical signals relating to an actual temperature of the at least one heatable hairdresser cutting tool;
- a controller activating the power circuit device to provide the heating current in response to the predefined target temperature; and
- a switching device for switching current to one of the connecting devices.

10. A control device according to claim 9, wherein the means for providing electrical energy is a storage battery and the controller regulates the heating current for the at least one heatable hairdresser cutting tool to set the target temperature assigned to the at least one heatable hairdresser cutting tool in response to the actual temperature.

11. A control device according to claim 9, wherein said means for entering at least one operating parameter, said means for detecting electrical signals, and said controller are integrated into the mobile unit.

12. A control device according to claim 9, further comprising a stationary unit communicating with the mobile unit via an air interface, the stationary unit transmitting data for controlling the power circuit to the mobile unit.

13. A control device according to claim 12, wherein data concerning the temperature of the at least one heatable hairdresser cutting tool can be transmitted from the mobile unit to the stationary unit via the radio interface.

14. A control device according to claim 9, wherein the signals relating to the actual temperature can be passed from the at least one heatable hairdresser cutting tool to via the respective connecting device.

15. A control device according to claim 9, wherein each connecting device comprises a single connector having a single electrical lead, via which both heating current and signals relating to the actual temperature can be passed.

16. A control device according to claim 9, wherein the mobile unit comprises a fastening device for attaching to a belt or a holster.

17. A control device according to claim 9, further comprising an indicator for indicating at least one of a heating phase or reaching the target temperature of the at least one heatable hairdresser cutting tool.

18. A control device according to claim 9, further comprising a means for detecting the heating current passed via the interface device and/or the voltage at the interface device.

19. A control device according to claim 9, further comprising a means for detecting a resistance of the at least one heatable hairdresser cutting tool connected to the interface device, wherein a type of cutting tool can be determined based on the resistance detected.

20. A control device according to claim 9, further comprising a means for detecting the electrical power passed via the interface device.

* * * * *